(12) United States Patent
Sintes et al.

(10) Patent No.: US 8,091,579 B2
(45) Date of Patent: Jan. 10, 2012

(54) LEVEL SENSOR

(76) Inventors: Hugh Corum Sintes, North Auckland (NZ); Mario Brian Daniel Becroft, New Auckland (NZ); Raymond John Pryor, Hamilton (NZ); Andrew Bryce Smith, Thuso (NZ)

( * ) Notice: Subject to any disclaimer, the term of this patent is extended or adjusted under 35 U.S.C. 154(b) by 1239 days.

(21) Appl. No.: 11/724,333

(22) Filed: Mar. 15, 2007

(65) Prior Publication Data

US 2007/0261487 A1 Nov. 15, 2007

Related U.S. Application Data

(60) Provisional application No. 60/795,172, filed on Apr. 27, 2006.

(51) Int. Cl.
*F16K 21/18* (2006.01)
(52) U.S. Cl. .................. 137/386; 137/392; 73/290 V
(58) Field of Classification Search .............. 137/386, 137/392; 73/290 V
See application file for complete search history.

(56) References Cited

U.S. PATENT DOCUMENTS

| | | | | |
|---|---|---|---|---|
| 2,565,159 A * | 8/1951 | Williams | 367/157 |
| 2,914,686 A * | 11/1959 | Clements et al. | 367/908 |
| 2,943,296 A * | 6/1960 | Fryklund | 73/290 V |
| 4,000,650 A * | 1/1977 | Snyder | 73/290 V |
| 4,146,869 A * | 3/1979 | Snyder | 367/99 |
| 4,162,473 A * | 7/1979 | Utasi | 367/99 |
| 4,183,007 A * | 1/1980 | Baird | 73/290 V |
| 4,221,004 A * | 9/1980 | Combs et al. | 73/290 V |
| 4,437,497 A * | 3/1984 | Enander | 73/290 V |
| 4,470,299 A * | 9/1984 | Soltz | 73/290 V |
| 4,487,065 A * | 12/1984 | Carlin et al. | 73/290 V |
| 4,551,719 A * | 11/1985 | Carlin et al. | 702/55 |
| 4,570,483 A * | 2/1986 | Sobue | 73/290 V |
| 4,715,398 A * | 12/1987 | Shouldice et al. | 137/386 |
| 4,869,287 A * | 9/1989 | Pepper et al. | 137/391 |
| 4,918,672 A * | 4/1990 | Iwabuchi et al. | 367/99 |
| 4,961,456 A * | 10/1990 | Stembridge et al. | 367/908 |
| 5,038,611 A * | 8/1991 | Weldon et al. | 73/290 V |
| 5,121,628 A * | 6/1992 | Merkl et al. | 73/290 V |
| 5,163,323 A * | 11/1992 | Davidson | 73/290 V |
| 5,550,790 A * | 8/1996 | Velamoor et al. | 367/908 |
| 6,672,155 B2 * | 1/2004 | Muller et al. | 73/290 V |
| 6,843,124 B2 * | 1/2005 | Otto et al. | 73/290 V |
| 7,062,967 B2 * | 6/2006 | Hale et al. | 73/290 V |
| 7,073,379 B2 * | 7/2006 | Schroth et al. | 73/290 V |
| 7,131,325 B2 * | 11/2006 | Nilsson et al. | 73/290 V |
| 7,243,539 B2 * | 7/2007 | Otto et al. | 73/290 V |
| 7,255,002 B2 * | 8/2007 | Gravel et al. | 73/290 V |
| 7,721,600 B1 * | 5/2010 | Sinclair et al. | 73/290 V |
| 2006/0005621 A1 * | 1/2006 | Lenk | 73/290 V |
| 2006/0201245 A1 * | 9/2006 | Huber et al. | 73/290 V |
| 2007/0084283 A1 * | 4/2007 | Carlson et al. | 73/290 V |
| 2010/0097892 A1 * | 4/2010 | Aughton et al. | 367/99 |
| 2010/0162811 A1 * | 7/2010 | Malinovskiy et al. | 73/290 V |

* cited by examiner

*Primary Examiner* — Craig Schneider
*Assistant Examiner* — Craig J Price
(74) *Attorney, Agent, or Firm* — Jacobson Holman PLLC

(57) ABSTRACT

A level sensor for providing an indication of liquid level in a container. The level sensor including an ultrasonic transducer for emitting an ultrasonic signal to the surface of the liquid and for detecting a return signal, reflected from the surface. A controller instructs the transducer to emit ultrasonic signals and receives an indication that a return signal has been detected. The controller including a timer for measuring the time period between emission of the ultrasonic signal and receipt of a return signal, the determined time period providing an indication of the liquid level. A radio transmitter receives an indication of the liquid level and transmits a radio liquid level signal to a remote output unit.

2 Claims, 13 Drawing Sheets

LEVEL SENSOR

This is a complete application claiming benefit of provisional 60/795,172 filed Apr. 27, 2006.

BACKGROUND TO THE INVENTION

1. Field of the Invention

This invention relates to level sensors and more particularly, though not solely, to continuous level sensors suitable for determining the level of liquids, such as water, in containers.

2. Background Art

Liquids such as water are often stored in containers in such a way that it is not possible to easily determine the level of liquid stored. The container may be for storing drinking water and/or for storing water for use in non-drinking applications such as toilet cisterns, oil tanks and laundry washing machines. For example, many houses and farms have large water storage containers made from concrete or heavy duty opaque plastics materials (such as rotationally moulded high density polyethylene). It is not possible to visually determine the amount of liquid in such containers. Sometimes it is necessary to climb on to such containers and to peer through an orifice to establish the level within the container. This is awkward and can be hazardous. Furthermore, the water container may be remotely located, requiring a special trip to determine its water level.

It is known to include level sensors in such containers in which wire pairs are provided at various discreet level within the tank. As the water level reaches on of the wire pairs, the wires are short circuited indicating to a controller the current water level in discreet increments. However, this method relies on the liquid having some conductivity and is subject to breakdown as it requires mechanical components such as wires to be continuously immersed in water. The discreet nature of the level reading is also a disadvantage.

Ultrasonic transducers have been used to provide an accurate non-contact level reading. Ultrasonic transducers (such as piezoelectric transducers) generate sound waves, at frequencies greater than about 20 kHz which is above the threshold for human hearing. The sound waves are reflected from the surface of the liquid and the time for the sound waves to be detected back at the transducer is determined. As the speed of the sound wave is known (and may be compensated for changes in temperature), this time provides a measure of the distance to the surface of the liquid and thence an indication of water level. This is an improvement over the previously described system but it is still necessary to transmit the output signal from the ultrasonic transducer to a controller and then on to an output device so that a user may be advised of the level. This has traditionally been achieved by running wires between the ultrasonic transducer and the controller and/or a display unit. This is prohibitively expensive in many home installations and also where the container is remotely located (such as on a farm).

In situations where electricity is scarce or unavailable, it would be an advantage if the power consumed by the system (and in particular the ultrasonic transducer) is minimised. Where batteries are used to provide electrical energy (for example, four AA-type cells), this would advantageously increase the time between battery replacements. It is also important to ensure that the ultrasonic transducer is transmitting its signals vertically, or nearly vertically, so that the return signal is received at the transducer. Unfortunately, many domestic and commercial water storage containers have sloped upper surfaces so that the transducer is not easily mountable on the upper surface of the container.

Accordingly, it is a object of the present invention to provide a level sensor system that will go at least some way towards overcoming the above disadvantages or which goes at least some way towards meeting the above desiderata or which will at least provide the public with a useful choice.

In one aspect, the invention may broadly be said to consist in a level sensor for providing an indication of liquid level in a container comprising:

an ultrasonic transducer for emitting an ultrasonic signal to the surface of the liquid and for detecting a return signal, reflected from the surface, a controller that instructs the transducer to emit ultrasonic signals and receives an indication that a return signal has been detected, the controller comprising a timer for measuring the time period between emission of the ultrasonic signal and receipt of a return signal, the determined time period providing an indication of the liquid level, and a radio transmitter that receives an indication of the liquid level and transmits a radio liquid level signal comprising the level indication to a remote output unit.

Preferably the level sensor comprises a reflector arranged to reflect ultrasonic signals emitted from the ultrasonic transducer, the ultrasonic transducer being oriented to emit ultrasonic signals towards the reflector.

Preferably the ultrasonic transducer comprises an emitter element, wherein the ultrasonic transducer is oriented to reduce condensation forming on the emitter element.

Preferably the ultrasonic transducer is oriented so that the emitter element faces horizontally and towards the reflector.

Preferably the reflector is a parabolic shaped reflector.

Preferably the level sensor comprises a housing, wherein the reflector is pivotably attached in or to the housing to alter the direction of a reflected ultrasonic signal emitted from the ultrasonic transducer.

In another aspect, the invention may broadly be said to consist in a level sensor adapted to be installed on, in or proximate a liquid container to sense a liquid level in the container, the level sensor comprising:

a housing adapted to be installed on, in or proximate a liquid container, an ultrasonic transducer with an emitter element, the ultrasonic transducer being for emitting an ultrasonic signal for directing towards the surface of a liquid in the container and for detecting a return signal, reflected from the surface, a parabolic reflector oriented to reflect a ultrasonic signal emitted from the ultrasonic transducer, a controller that instructs the transducer to emit ultrasonic signals and receives an indication that a return signal has been detected, the controller comprising a timer for measuring the time period between emission of the ultrasonic signal and receipt of a return signal, the determined time period providing an indication of the liquid level, and a radio transmitter that receives an indication of the liquid level and transmits a radio liquid level signal comprising the level indication to a remote output unit, wherein the ultrasonic transducer emitter element is oriented at least partially face horizontally towards the parabolic reflector, and wherein the parabolic reflector is pivotably attached to or in the housing to enable directing of a reflected ultrasonic signal emitted from the ultrasonic transducer towards the surface of the liquid in the liquid container, when the level sensor is installed on, in or proximate a liquid container.

In another aspect, the invention may broadly be said to consist in a level sensor system for providing an indication of liquid level in a container, comprising:

a transducer unit for mounting above the surface of the liquid and comprising:

an ultrasonic transducer for emitting an ultrasonic signal to the surface of the liquid and for detecting a return signal, reflected from the surface, a controller that instructs the transducer to emit ultrasonic signals and receives an indication that a return signal has been detected, the controller comprising a timer for measuring the time period between emission of the ultrasonic signal and receipt of a return signal, the determined time period providing an indication of the liquid level, and a radio transmitter that receives an indication of the liquid level and transmits a radio liquid level signal including the level indication, and an output unit for locating remotely from the transducer unit and comprising a radio receiver that receives the radio liquid level signal, a controller that extracts the liquid level indication from the radio liquid level signal, and a user output device that provides an indication to a user of the liquid level.

Preferably the transducer unit comprises a housing, the housing comprising an opening in its lower surface through which the ultrasonic signal and the return can signal pass.

Preferably, the housing is adapted to be mounted about an orifice formed in the upper surface of the liquid container to which the transducer unit is to be attached.

Preferably, the transducer unit includes a housing in which the various transducer unit components are housed, the housing including an opening in its lower surface through which the ultrasonic signal and the return signal pass.

Preferably, the housing has a lid and the transducer unit further comprising a heat shield is mounted above the lid to cover substantially the entire area of the lid.

Preferably, the heat shield is spaced from the lid so as to allow air circulation between the lid and the heat shield.

Preferably, the housing comprises a skirt, the lower surface of which forms a base adapted to contact the upper surface of a liquid container, wherein the skirt is formed from at least two pieces that are rotational relative to one another and engage along a camming surface formed in the skirt that is non-parallel to the base.

Preferably, the opening in the lower surface of the housing is surrounded by a wall adapted to be inserted within the orifice formed in a liquid container.

Preferably, the wall surrounding the opening in the housing's lower surface extends beyond the base of the base of the skirt.

Preferably, the transducer controller is programmed to occasionally obtain an indication of the liquid level in the container.

Preferably, the transducer controller is programmed to occasionally transmit the radio liquid level signal.

Preferably, an indication of the liquid level is obtained more often than the liquid level signal is transmitted.

Preferably, the indication of the liquid level is obtained by averaging a plurality of determined time periods between different ultrasonic signals and their respective return signals.

Preferably, the output unit includes user input means that, when activated by a user, causes the output unit to provide the indication of the liquid level to the user.

Preferably, once the user input means is activated by a user, the indication of the liquid level is provided to the user for only a predetermined period of time.

Preferably, power to operate the various components of the transducer unit is provided by batteries.

Preferably, the transducer controller and/or the output unit controller are operable in low and high power consumption modes wherein the controller or controllers are operated in the low power consumption mode unless it or they are obtaining an indication of the liquid level, transmitting a radio liquid level signal, receiving the radio liquid level signal or providing an indication to a user of the liquid level.

Preferably, in determining the time period between emission of the ultrasonic signal and the receipt of the return signal, the transducer controller is programmed to initially emit an ultrasonic signal with a first power and if no return signal is detected then to emit an ultrasonic signal with a second power, greater than the first power and to then detect a return signal.

Preferably, if no return signal is detected from the ultrasonic signal with the second power, then the transducer controller emits an ultrasonic signal with a third power, greater than the second power, and detects a return signal.

Preferably, the transducer controller activates the radio transmitter to transmit the radio liquid level signal at predetermined times and the output unit controller activates the radio receiver to listen for the transmitted radio liquid level signal for a defined period of time at said predetermined times.

Preferably, the predetermined times at which the transducer unit controller and the output unit controller are activated are set by pseudorandom number generators within the transducer unit and output unit respectively, wherein a sequence code is included in the radio liquid level signal transmitted by the transducer unit transmitter that is used to initialise the pseudorandom number generator in the output unit so that the two pseudorandom number generators may be synchronised.

Preferably, a liquid supply line is provided to the liquid container with liquid flow controlled by a flow control device in the liquid supply line, wherein the output unit includes means to allow a user to set an upper liquid level limit and a lower liquid level limit to the controller and a transmitter that transmits a radio level signal including the upper and lower liquid level limits under control of the output unit's controller, wherein the flow control device receives the radio liquid level signal transmitted by the transducer unit's transmitter and the radio level signal transmitted by the output unit's transmitter and controls the flow of liquid to the container via the supply line so that the liquid level is maintained between the upper and lower liquid level limits.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting

BRIEF DESCRIPTION OF THE DRAWINGS

Preferred embodiments of the invention will now be described with reference to the accompanying drawings in which.

DETAILED DESCRIPTION OF THE PREFERRED EMBODIMENTS

Figure 1:
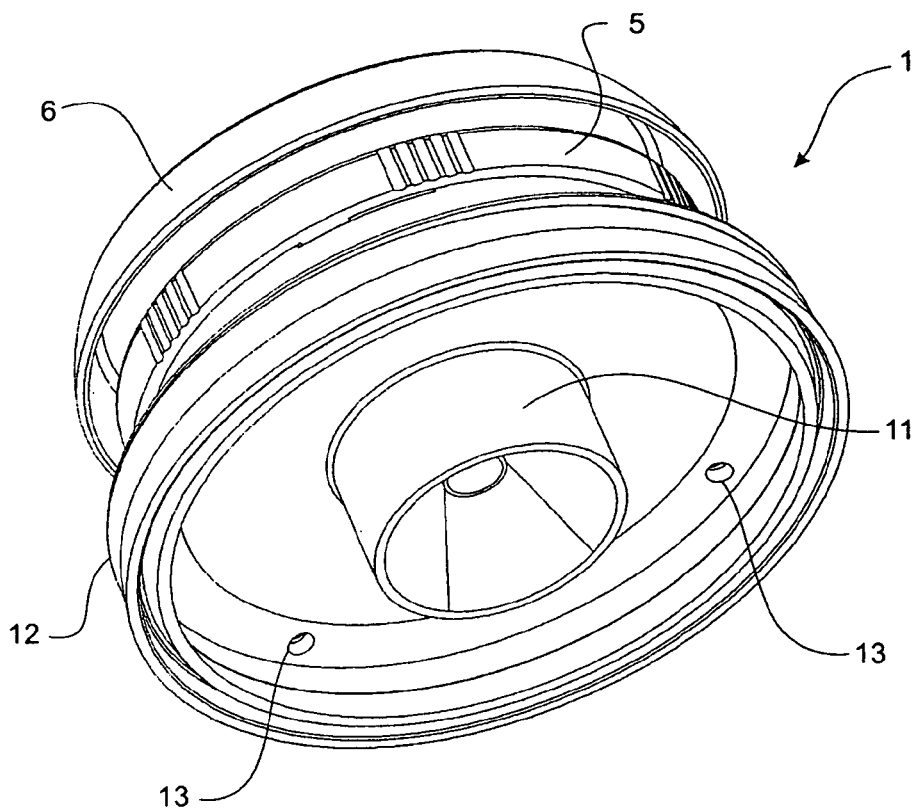
FIG. 1 is a perspective view from below of a preferred embodiment of the transducer unit of the level sensor system according to the present invention.
Figure 2:
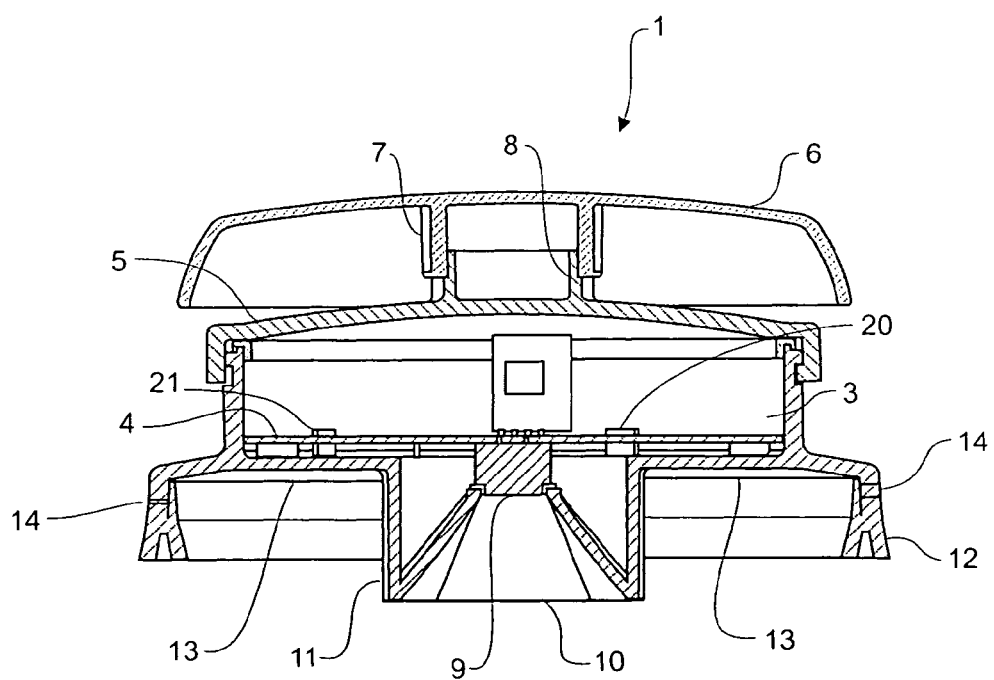
FIG. 2 is a cross-sectional view through the transducer unit of FIG. 1.
Figure 3:
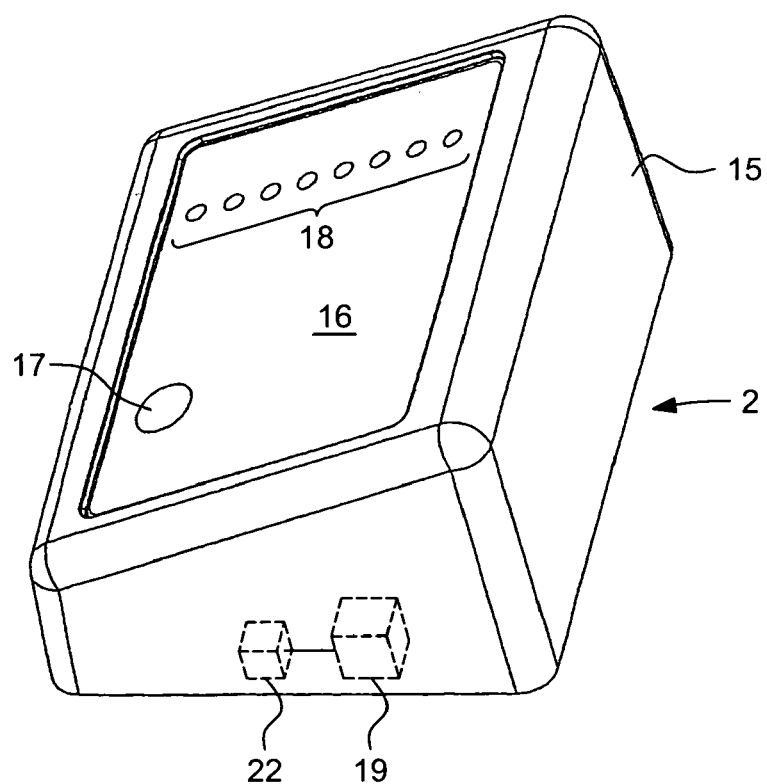
FIG. 3 is a perspective view from one end of a preferred embodiment of the output unit of the level sensor system according to the present invention.

With reference to the drawings and in particular FIGS. 1 to 3, the components necessary to set up a liquid level sensing system according to the present invention are shown. The components comprise a transducer or transmitter unit I and an output or "bench" unit 2. Both units may conveniently and cost effectively be manufactured by plastics injection moulding techniques.

First Embodiment

Mechanical Design

The housing of the transducer unit 1 is generally circular when viewed from above and encloses a central space 3 in which electronic components on circuit board 4 are protected from the environment. A lid 5 is removable from the lower part of the housing to allow a user to gain access to the electronic components and to batteries that provide power to the transducer unit. The lid is preferably a "bayonet fit" to the lower portion of the housing. The housing may for example be about 140 mm in diameter.

The transducer unit is adapted to be mounted to the upper surface of a liquid container 23 (see FIG. 4) such as a large plastics rotationally moulded water container that may hold, for example, 30,000 litres of water. The transducer unit may therefore be directly exposed to the sun and so a heat shield 6 is provided to shield the lid of the housing from the sun. In this way, the temperature within space 3 of the housing is reduced so that the electronic components therein may operate in a more desirable temperature range and so that their operational life times may also be extended. The heat shield may also act as a sacrificial component as it will block harmful UV radiation that would otherwise damage the lower parts of the housing. As can be seen in FIG. 2, heat shield 6 has a downwardly extending central cylindrical wall that is a tight fit about a complementary cylindrical wall extending upwardly from the lid 5. In this way the heat shield is easily removable and/or replaceable. An air gap is provided between lid 5 and heat shield 6 to enable a localised cooling air flow through the gap, further negating the harmful effects of direct solar radiation on the transducer unit and its internal electronic components.

A sealed ultrasonic ranging transducer 9 is mounted on circuit board 4. The transducer may comprise a piezoelectric crystal controlled by drivers which are in turn controlled by a programmed microcontroller or microprocessor 20. The lower surface of the transducer housing is provided with an opening 10 aligned with transducer 9 to allow ultrasonic sound waves to be transmitted and received by the transducer clearly. The opening is surrounded by a cylindrical or frusto-conical wall 11 acting as a waveguide or horn. The distance of the liquid's surface to the ultrasonic transducer is expected to be within the range of about 3.5 m to about 0.5 m.

The upper surface of water containers of the type mentioned above are usually sloped at an angle to horizontal so that rain water runs off the container without accumulating and to improve structural rigidity. To ensure that the ultrasonic signal emitted by the transducer is able to be directed vertically downwardly, the lower portion of the housing includes a mounting angle adjustment mechanism. It can be seen in FIG. 2 that the lower portion of the housing includes a cylindrical or frusto-conical downwardly directed skirt 12. The lower edge of skirt 12 defines the base of the housing and which sits on the upper surface of the liquid container. To mount the transducer unit to the container, a small hole (for example 50 mm in diameter) is made in the liquid container's upper surface, preferably at least about 60 cm from the side surface to minimise reflection of the signal from the side wall.

The cylindrical or frusto-conical wall 11 is inserted in the hole formed in the container and the skirt 12 compressed against the container's surface by inserting screws through holes 13 and into the container's upper surface. Skirt 12 is formed in two separate parts, separated by a cut line 14 non-parallel to the base of the housing. As a result, the lower portion of the skirt forms an annular camming ring onto which the remainder of the housing sits. The upper portion of the housing and/or the lower portion of the skirt may then be rotated relative to one another to thereby adjust the angle of the transducer element so that a user may set the angle to approximately vertical. The angle of the cut line may be around 7.5° relative to the base so that up to around a 15° change may be obtained by rotating the housing and camming ring by 180° relative to one another. Additional camming rings may be inserted in the gap between the two skirt portions if necessary for particularly steeply sloped container upper surfaces.

Although not shown in FIGS. 1 and 2, a user input button may be provided on the outside of the housing or within cavity 3 to allow the user to calibrate the unit. It will be appreciated that the mechanism for determining liquid level relies upon measuring the time period for an ultrasonic wave to travel from the transducer, reflect from the liquid's surface and be detected back at the transducer. The speed at which the signal travels in air is known and substantially constant although it varies with temperature and so a temperature sensor may be included in the transducer unit to compensate for this variation. Therefore, the measured time period may be assumed to be inversely proportional to the distance to the liquid's surface. That is, a long period indicates a low liquid level and a short period indicates a high level.

So that the transducer controller can determine a water level, it must first establish a datum point. This may be accomplished by a user pointing the ultrasonic transducer unit at a wall that is at a distance substantially equivalent to the depth of the liquid container. The user may then depress the calibration button and the ultrasonic transducer will determine the time taken to receive a reflected signal. This period (corresponding to empty or the lowest possible water level) will then be used for comparison with future detected periods to establish a water level value. For example, if a future detected time period is half of the recorded "empty" level, then the water level value will be established as half full.

As shown in FIG. 3, output unit 2 features a housing with a rear side 15 and a base suitable for bench mounting. The housing includes a face plate 16 providing an interface for a user. The user interface includes an input device such as button 17 and a user output device such as a display to provide a user the user with an indication of the level of liquid within the container. The display shown in FIG. 3 is a simple version in which a series of light emitting diodes (LEDs) 18 are illuminated in series to indicate the water level. That is, for example each one of eight LEDs represent liquid levels of ⅛, ¼, ⅜, ½, ⅝, ¾, ⅞ and full. So a liquid level of ⅜ full would result in the lower three LEDs being illuminated while a liquid level of ¾ would result in the lower six LEDs being illuminated. Of course, different displays could be used including graphical displays such as liquid crystal displays and/or the user output device could provide an audible output to a user. For example the liquid level could be verbally output by the output unit or a number of audible beeps corresponding to the level could be emitted from a speaker. The display could also vary in colour or brightness in proportion to the detected water level. For example, the eight LEDs shown in FIG. 3 could be different colours such as red for the lowest two, yellow for the next two and green for the highest four.

The output unit's housing may contain a source of electrical energy such as batteries and/or it may receive power form an external connection such as a low voltage DC voltage supply (as the output unit is likely to be conveniently located inside, near a power outlet). As will be explained below, an energy saving feature of the invention is that the display is only energised when requested to do so by the user. Button 17 is provided for this purpose and is connected as an input to a programmed microcontroller or microprocessor 19 that is connected so as to drive the elements of the user display. For example, depression of button 17 may cause the display top be energised for 5 seconds only.

Electrical Design

Figure 4:
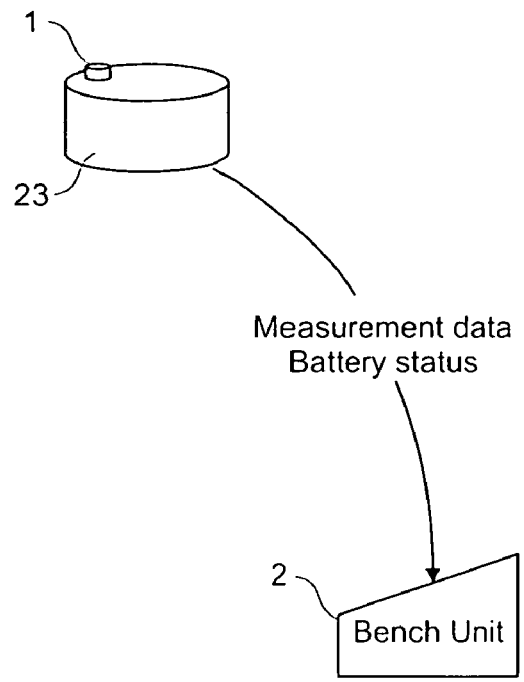
FIG. 4 is a schematic diagram of information flow in a preferred embodiment of level sensor system according to the present invention.

Both the transducer unit 1 and the output unit 2 comprise wireless communication devices connected the their respective controller 19 or 20. A minimal configuration employs a radio transmitter 21 within transducer unit 1 and a receiver 22 within output unit 2. As shown in FIG. 4, this minimal arrangement allow the transducer unit to transmit a signal to the output unit unidirectionally. For example, a 433 MHz or 2.4 GHz ASK modulated radio link at 1200 baud may be used. The frequency chosen should be within an unregulated frequency band. Preferably the radio link is capable of transmitting over a distance of up to 100 m in a line-of-sight path.

The representation of the level signal transmitted from the transducer unit to the output unit may be a non-return to zero serial format with eight data bits and one stop bit. The content of the "water level" signal may be transmitted in packets consisting of a synchronisation pattern, a start of packet marker and a data section. The synchronisation pattern may consist of eight $55 bytes for example. The start of packet marker may consist of one $AA byte. The data section may consist of a four byte station identifier (identifying the transducer unit uniquely), a two byte sequence number (explained below), a two byte water level indication value repeated once and a single byte battery status indication value repeated once. The level and battery status values are repeated to improve reliability, particularly when the radio link is only half duplex. Error correcting codes could alternatively or in addition be used.

The transducer unit's transmitter may be energised to send a water level signal periodically (for example, at least once per hour) at preset times or, more preferably, at pseudorandom time intervals to avoid "collisions" with other transducer units that may be in the same area. For this purpose, the transducer unit 1 and the output unit 2 may be provided with pseudorandom number generators which may be implemented in software or hardware. The output unit's controller may operate in either an acquisition phase or a synchronised phase. Initially, operation is in the acquisition phase with the receiver always enabled and continually listening for a valid packet from the transducer unit's transmitter.

Once a packet is received, the sequence number (mentioned above) in the received packet is used to initialise the output unit's pseudorandom number generator and the output unit's controller changes to the synchronised phase. The receiver is now enabled only for brief intervals controlled by the pseudorandom number generator which is now synchronised with the identical generator in the transducer unit. This ensures that the transmitter and receiver are enabled at the same time intervals. This feature conserves power and reduces the chance of nearby units interfering with one another. If no valid packets are received for two consecutive time slots then the receiver controller may revert back to the acquisition phase. If the output unit's controller has not received a water level reading for a predetermined period of time then all of the LEDs 18 in the display may be caused to flash on and off when the display is energised by pressing button 17.

The water level indication value included in a data packet may simply be the time period value (or "range") determined by the transducer rather than a subsequently calculated distance value. The output unit controller may be provided with a table of ranges and corresponding indicator illumination patterns. Whenever a packet containing a water level indication is received, the indication is looked up and the corresponding indicator illumination pattern for the LEDs 18 activated. There may therefore be eight primary illumination patterns corresponding to the eight discrete liquid levels ranging from full to empty. There may also be an out of range illumination pattern, a no data received illumination pattern and a low battery illumination pattern. These special patterns may be activated by the output device's controller when the relevant conditions occur.

A further feature of the invention aimed at extending battery life in the transducer and/or receiver units is the incorporation of controllers capable of operating in a low power or "sleep" mode. Such a controller is the Texas Instruments' MSP430F2101 MCU. This controller has an ultra low power consumption mode in which it draws less than 1 µA with a low frequency (32 kHz) clock running. This enables the controller to be powered all the time and wake itself at regular intervals for performing measurements and for communications. In the sleep state only a watchdog timer and an interval timer are running. The interval timer causes an interrupt to occur periodically, for example, every 8 seconds.

When the interval timer interrupt occurs, a time counter is incremented and an event list consulted. If an event is scheduled to occur at the time corresponding to the present time counter then a flag is set and the controller is placed into the normal running mode (that is, the controller "wakes up"). For the output unit, a scheduled event is "radio receive" while for the transducer unit, scheduled events are "acquire range" and "radio transmit". Once in the normal running mode, a main loop program monitors the flag for each possible event type and if a flag is set, the program associated with that event is executed. Waking of the controller in the output unit also occurs if the user presses button 17 to activate the display.

Figure 5:
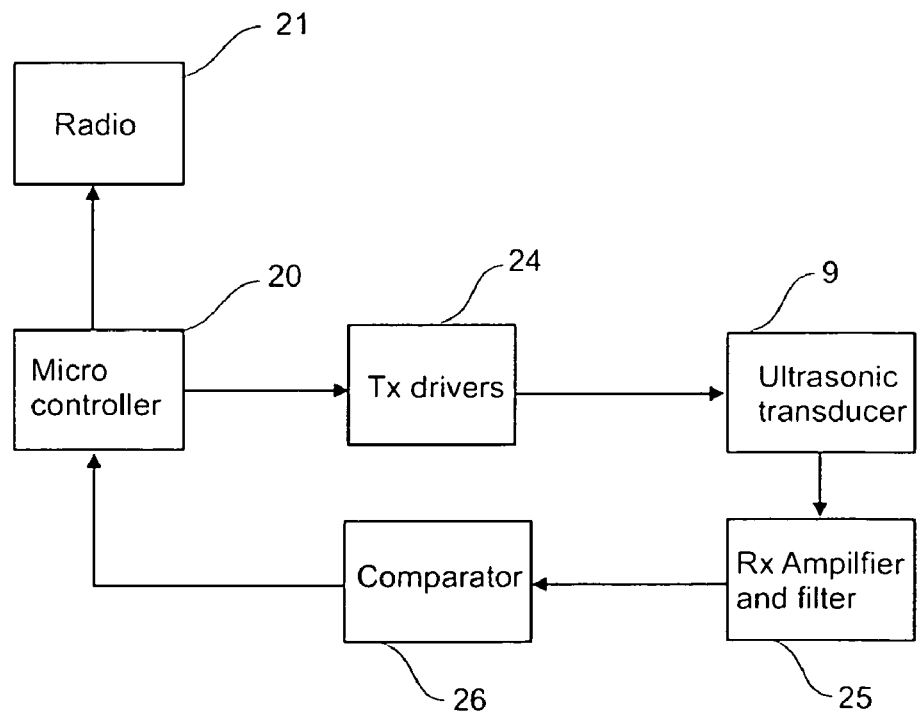
FIG. 5 is a block diagram of the electronic components within the transducer unit of FIG. 1.
Figure 6:
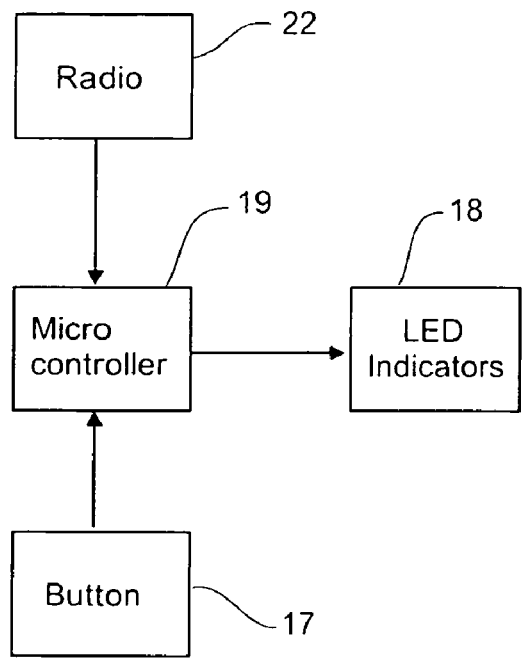
FIG. 6 is a block diagram of the electronic components within the output unit of FIG. 3.

FIGS. 5 and 6 show example block diagrams of control and information flow for the transducer unit and output unit respectively, most of which, particularly for the output unit, has already been explained above. Transmitter drivers 24 drive the ultrasonic transducer 9 with, for example, a 40 kHz square wave at 5V or 10V peak-to-peak and for a variable duration (selection of these variables in an adaptive transmit power control system will be explained below). Amplifier circuit 25 may consist of 4 operational amplifier stages with two second order band-pass filter stages having a quality factor of around 10. The amplifier may have a total gain of around 60 dB at 40 kHz. Comparator circuit 26 may consist of an analogue comparator and a reference voltage derived from the transducer unit's nominally regulated 5V supply line via a resistor divider. The output of comparator 26 will therefore be high only when the ultrasonic transducer receives a return signal sufficiently high to produce a signal form amplifier 25 that is greater than the reference voltage.

Of course, two way communications between the transducer 1 and output 2 units could be provided. In this way, the output unit could provide confirmation of receipt of data from the transducer unit. Radio transceivers could be included in each unit to enable the two-way communications.

Figure 7:
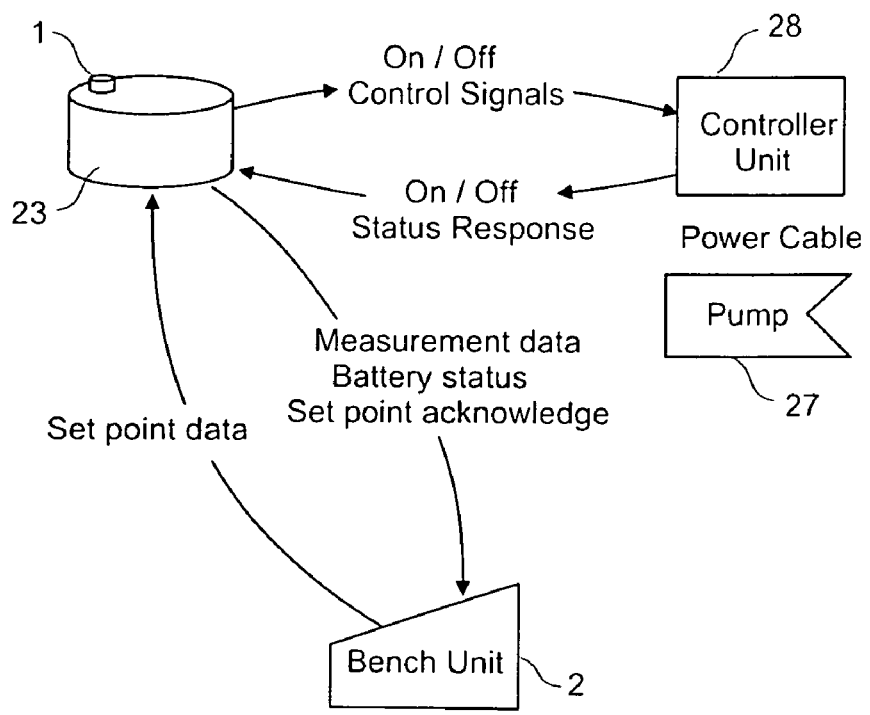
FIG. 7 is a schematic diagram of information flow in an alternative preferred embodiment of level sensor system according to the present invention.

Another use of two-way communications between the two units is shown in the block diagram of FIG. 7. In this alternative system, output unit 2 is provided with further user input devices such as additional buttons. The additional buttons enable the user to enter an upper liquid level limit and a lower liquid level limit. These values input by the user are then transmitted as set point data to transducer unit 1 and an acknowledgement signal returned to the output unit to confirm receipt. In this embodiment (or in the preceding embodiment) a temperature sensor may be mounted in one or both of the transducer and output units and the information displayed on the output unit may include one or both temperatures as inside and outside temperatures. The temperature of the sensor within the transducer unit would be included in the data transmitted with the water level signal to the output unit. The display on the output unit may also be configured to show the current time which is able to be set by the user with the help of the input buttons.

A liquid supply line (not shown) is provided to container 23 to replenish the liquid stored therein as it is consumed. The liquid supply line may, for example, be from a mains water supply or from a water reservoir. A flow control device such as a valve or pump 27 is located in the liquid supply line to control liquid flow therein. Operation of pump 27 is by way of a pump controller unit 28 which includes a radio receiver, more preferably a radio transceiver. The transducer controller 20 would compare the present water level value with the user set upper and lower limits. If the presently determined level is lower than the lower liquid level limit then a signal will be transmitted to controller unit 28 to energise pump 27 to initiate flow of liquid to container 23. As the level increases and finally reaches the upper liquid level limit (as determined by the transducer unit), transducer unit controller 20 issues a radio signal to pump controller 28 to deactivate pump 27.

As mentioned previously, an adaptive transmit power control system may be implemented to establish liquid level readings. As an example, level readings may be made about once every minute. Acquiring a level measurement involves performing a certain number of measurement cycles. The result of each cycle is recorded and statistical analysis (such as averaging) carried out on the plurality of results of all measurement cycles to determine the range to the liquid's surface and hence the liquid level. A measurement cycle consists of one or more ranging cycles. Each ranging cycle employs a ranging profile that controls the parameters to be used for performing that measurement. The ranging attributes are defined as:

Power level—the power level to use for transmitting the ultrasonic signal (or "ping"). This value may be either 5V or 10V peak-to-peak Transmit duration—the duration of the transmitted signal, defined as a number of 40 kHz cycles from 1 to 255.

Damping period—the duration of the damping period, defined as a number of timer ticks Guard period—the duration of the guard period, defined as a number of timer ticks Maximum echo period—the maximum echo delay A series of ranging profiles are defined and which are executed sequentially until a valid range has been determined. The energy expended during each ranging cycle increases from the first to the last. For example, three ranging profiles may be defined. The first profile may be for short ranges (less than about 0.5 m), the second range may be for long ranges (0.5 m to about 2 m) and the third range may be for very long ranges (above about 2 m). We have found the following settings for each of these three ranging profiles to be particularly advantageous:

| PROFILE_SHORT | PROFILE_LONG | PROFILE_VERYLONG |
|---|---|---|
| Power: high (10 V) | Power: high (10 V) | Power: high (10 V) |
| Tx cycles: 2 | Tx cycles: 6 | Tx cycles: 20 |
| Damping period: 20 cycles | Damping period: 30 cycles | Damping period: 30 cycles |
| Guard period: 80 cycles | Guard period: 140 cycles | Guard period: 300 cycles |
| Max echo period: 16 ms | Max echo period: 24 ms | Max echo period: 32 ms |

Figure 8:
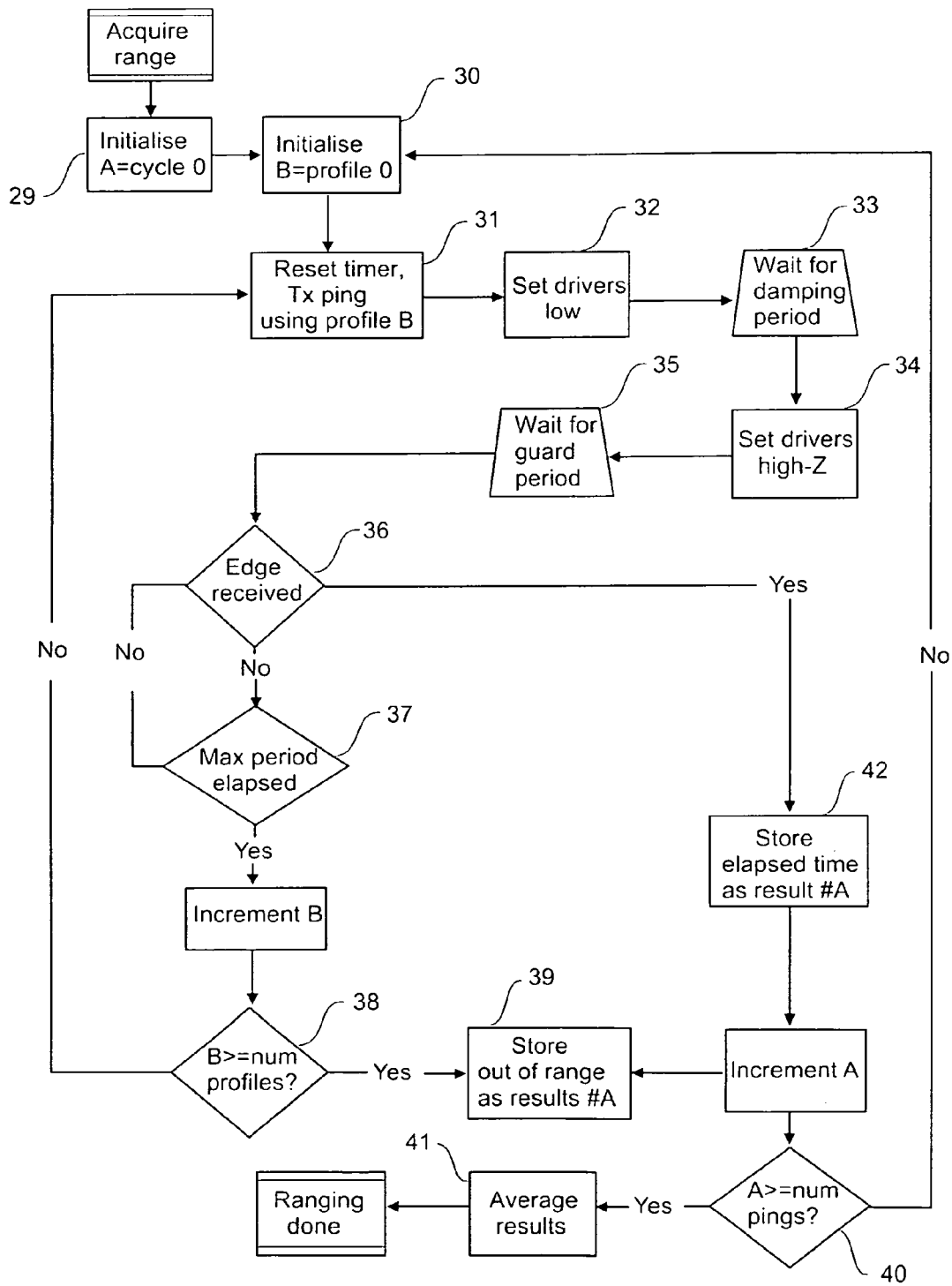
FIG. 8 is a flow diagram explaining the operation of the transducer unit of FIG. 1 as it obtains level readings using adaptive power control.
Figure 9A:
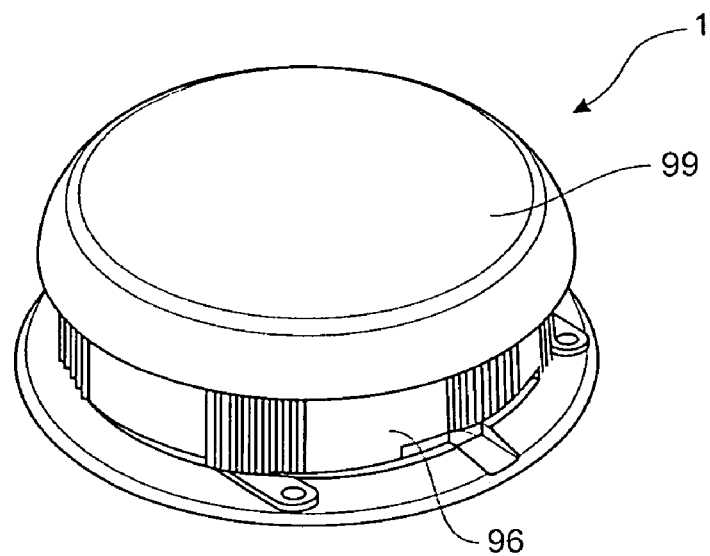
FIGS. 9a-9c show perspective, plan and elevation drawings of the transducer unit.
Figure 9B:
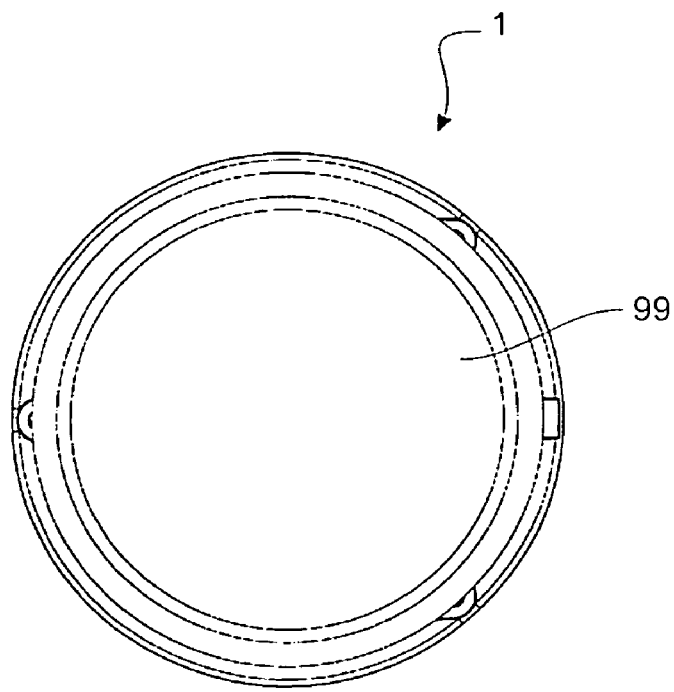
Figure 9C:
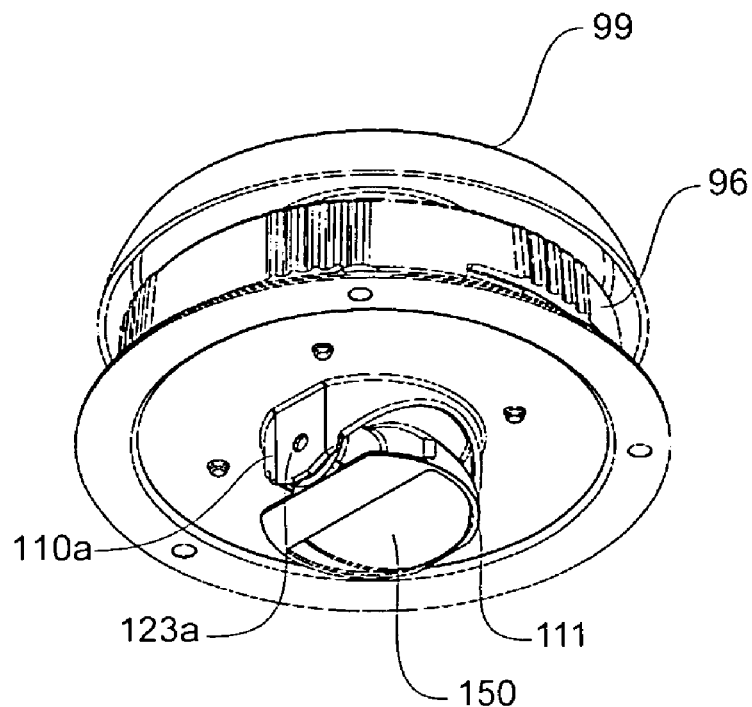
Figure 9D:
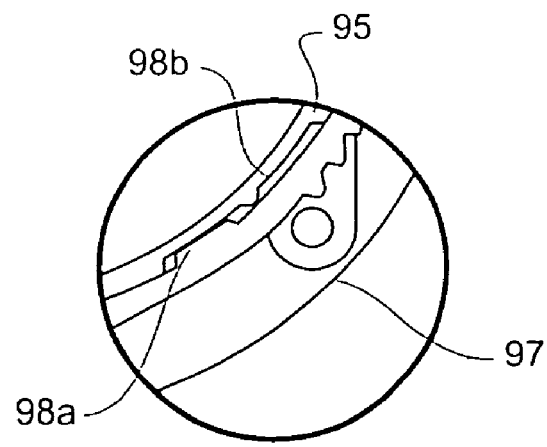
FIGS. 9d, 9e and 9f show further details of a lid and base coupling.
Figure 9E:
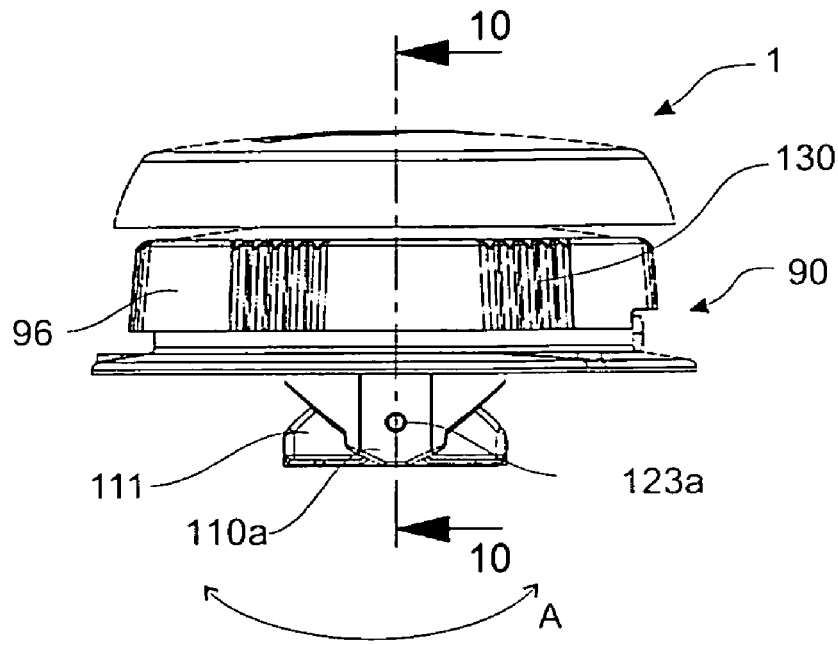
Figure 9F:
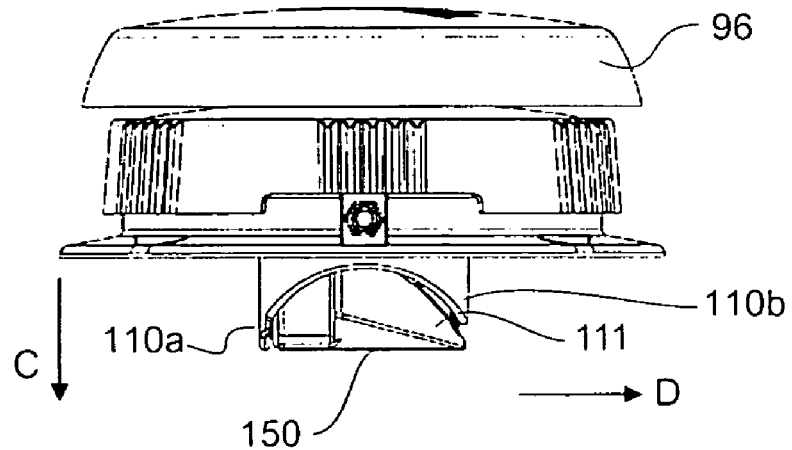

The adaptive transmit power control method will now be explained with reference to FIG. 8. In steps 29 and 30, variables A (representing the number of cycles over which the statistical calculations will be made to determine the range/level) and B (representing the current ranging profile) are initialised to zero. At step 31 a 40 kHz square wave at the power level and for the duration defined in the current ranging profile is transmitted by ultrasonic transducer 9. In step 32, the transmit drivers are placed into the low power/voltage state and a delay period commences at step 33 for the damping period defined in the current ranging profile. At step 34 the drivers are then set to high impedance mode so that the ultrasonic transducer is placed in an input mode where it may sense ultrasonic waves incident upon it and output a corresponding voltage to amplifier/filter 25 and comparator 26. At step 35 a further delay is commenced for the duration of the guard period defined in the current ranging profile.

At step 36 a decision is made whether the comparator has output a signal indicating that a return signal (or "edge") has been detected. If no return signal has been detected then a further delay period is commenced at step 37 for the echo period defined in the current ranging profile. If no return signal is detected then variable B is incremented and if the new value of B is less than the number of ranging profiles at step 38 then control returns to step 31. If the new value of B is greater than the number of ranging profiles then all ranging profiles have been attempted and it has not been possible to obtain a value for the liquid level for this cycle. Accordingly, at step 39 an out of range result is recorded against the current cycle and variable A (indicating the current cycle) is incremented. If the new value of A is equal to the preset maximum number of cycles (for example, 5 cycles) at step then the results are averaged at step 41 to arrive at a value for the current range and hence the current liquid level.

If at step 40 it is determined that the total number of cycles has not yet been carried out then control returns to step 30 where the next cycle commences with the lowest ranging profile.

If at step 36 a return signal is detected then at step 42 the elapsed time from the beginning of the current cycle is stored as the ranging/level result for the current cycle, variable A is incremented and control passes to step 40 as described above.

The present invention therefore provides a convenient, cost-effective and energy efficient system for enabling a user to determine the liquid level in storage containers that may be remotely located. It is envisaged that four AA-type batteries within the transducer and output units will be sufficient to power either device for up to a year under normal use conditions.

Second Embodiment

A second embodiment of the invention will be described with reference to FIGS. 9a-16c. The second embodiment has additional features to the first embodiment. The level sensing system comprises a level sensing transducer unit and a remote bench/output unit. The transducer unit and bench unit communicate by radio transmission. The second embodiment provides level sensing functionalities similar to that in the first embodiment. The transducer and output units of the second embodiment comprise substantially similar electronics to the first embodiment. Therefore, the features from the first embodiment can be assumed to be incorporated into the second embodiment. Only the differences will be described.

Transducer Unit

Referring to FIGS. 9a-9c and FIG. 10, the housing 90 of the transducer unit 1 is generally circular when viewed from above and encloses a central space 93 (visible in FIG. 10) in which electronic components on a circuit board 94 are protected from the environment. The housing 90 comprises a lower assembly 91 comprising a base 92 and a cylindrical wall 95. The wall 95 the housing might be tapered to improve rigidity and strength, especially at the intersection between the wall and the base. The electronic components on the circuit board 94 are disposed on the inner side of the base 92. The housing 90 also comprises a lid 96 that is adapted to connect to the cylindrical wall 95 of the lower housing assembly 91. The lid 96 and cylindrical wall 95 couple to form the central space 93. The lid 96 comprises a skirt 97 that comprises a coupling 98a that is adapted to connect to a corresponding coupling 98b in the cylindrical wall of the lower assembly 91. Preferably, the coupling 98a, 98b comprises a protrusion or protrusions protruding inwards from the skirt of the lid 97 that engage and lock into recesses or channels 98b formed on the inner side of the cylindrical wall 95 of the lower assembly 91. The couplings 98a, 98b can be seen in more detail in FIG. 9d. Coupling can be achieved by aligning the protrusions 98a and corresponding recesses 98b, and then twisting the lid 96 and base 91 relatively to lock and couple the two components together. The lid 96 of the housing has protrusions 130 on the wall. This provides grip and assists a user to attach the lid 96 to the base 91 of the housing via a twisting motion. The lid 96 is removable from the base of the housing 91 to allow a user to gain access to the electronic components and to batteries that provide power to the transducer unit 90. Alternative coupling means could be provided. For example, the lid 96 could snap-fit over the wall 95 of the lower housing assembly 91.

The transducer unit 1 also comprises a detachable heat shield 99. The heat shield defines an open hollow space 100 and comprises a central cylindrical column 101 (seen in more detail in FIG. 11) that acts as a mounting column. The mounting column 101 is adapted to snap-fit or otherwise couple to a corresponding cylindrical mounting column 102 extending from the lid 96 of the housing 90. As in the first embodiment, the heat shield 99 provides the housing 90 and the internal components 94 with protection from heat and UV.

Figure 10:
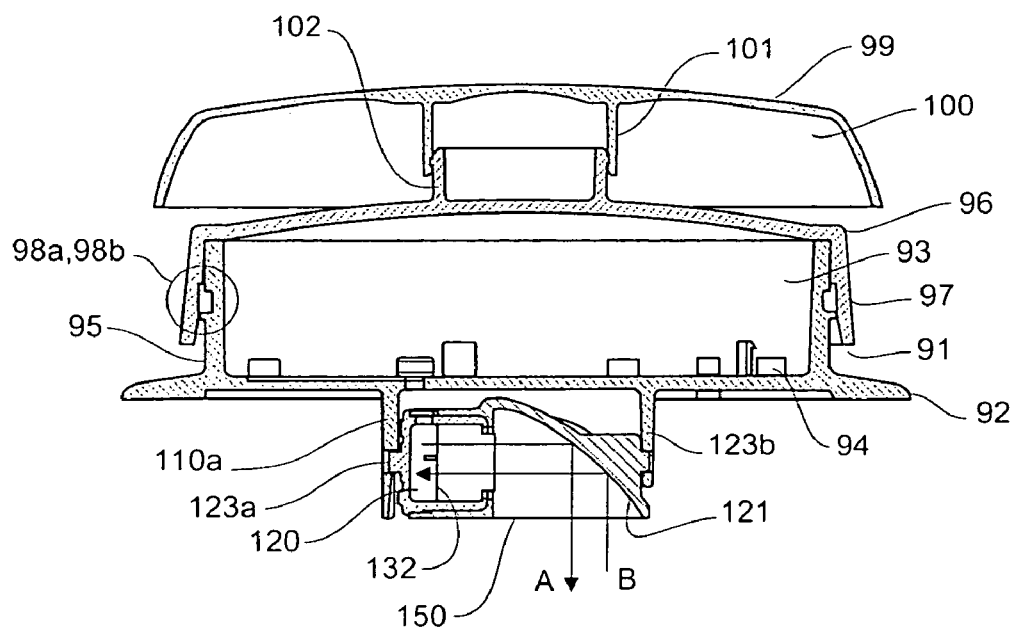
FIG. 10 shows a cross-sectional view of the transducer unit.
Figure 11:
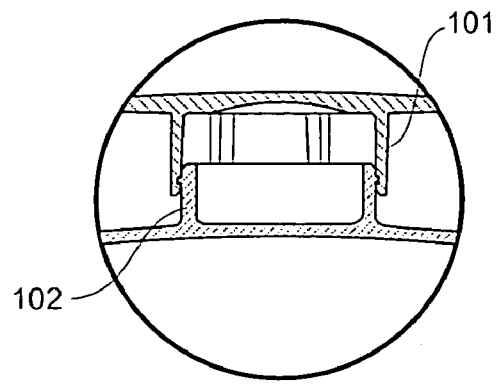
FIG. 11 shows further detail of the heat shield and lid coupling.

The underside of the base 92 of the housing 90 comprises pivot arms 110a, 110b. A pivot cradle 111 is attached to the pivot arms 110a, 110b. The pivot cradle supports an ultrasonic transducer 120 and comprises a parabolic reflector 121 (as can be seen in FIG. 10 and in more detail in FIG. 12). The ultrasonic transducer 120 comprises an emitter/receiver element 132 for emitting signals generated by the transducer 120, and receiving signals reflected back to the transducer. The emitter/receiver element 132 has a surface. Altering the direction of the emitter element (that is, altering the surface direction) controls the direction in which an emitted ultrasonic signal travels. The pivot cradle 111 also has a signal aperture 150, through which an ultrasonic signal can travel to and from the ultrasonic transducer 120. The pivot cradle 111 comprises two stub axles 123a, 123b that sit and rotate within apertures on the pivot arms 110a, 110b. This enables the pivot cradle 111 to rotate about the axis of the stub axles 123a, 123b through a range of around 40 degrees as shown by arrow A in FIG. 9b. The cradle 111 enables a user to alter the angle of the signal aperture 150 to assist in directing an ultrasonic signal emanating from the ultrasonic transducer 120.

Figure 12:
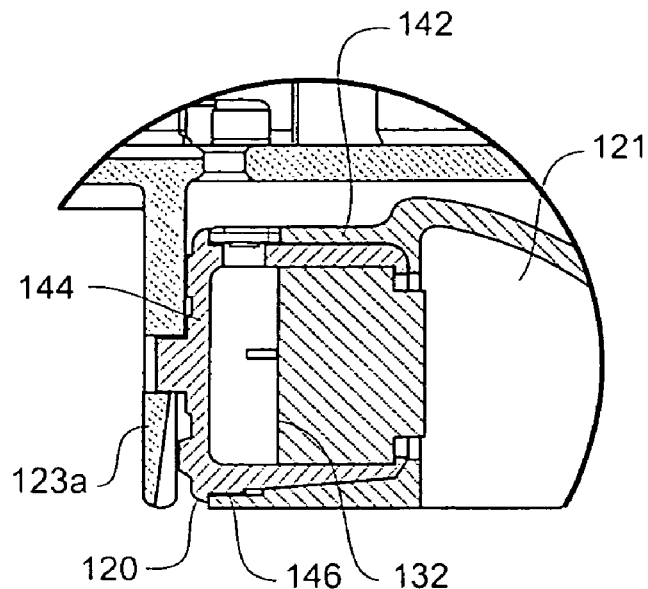
FIG. 12 shows further detail of the pivot cradle with transducer and parabolic reflector.

As can be seen in FIGS. 10 and 12, the ultrasonic transducer is arranged such that the emitter/receiver element 132 emits an ultrasonic signal (see arrow A in FIG. 12) towards the parabolic reflector 121. Upon hitting the parabolic reflector 121, the ultrasonic signal A will be diverted downwards, generally as shown by arrow A and out through the signal aperture 150. Similarly, a received ultrasonic signal B that has been reflected from the surface of a liquid in the liquid container, generally travels in the direction as shown by arrow B and can be reflected off the parabolic reflector 121 towards the emitter/receiver element 132 of the transducer 120. As will be known to those skilled in the art, the parabolic reflector 121 is shaped such that the relative angles of the reflector and the emitter element can vary while still enabling emitted ultrasonic signals A to egress out the signal aperture 150 and received signals B to the emitter/receiver element 132.

Using a reflector 121 to reflect emitted ultrasonic signals A out the signal aperture 150 enables the transducer 120, and more particularly the emitter/receiver element 132 of the transducer, to be oriented such that the emitter/receiver surface is facing laterally rather than vertically. If the emitter/receiver surface is facing vertically (that is, if it points at 90 degrees directly from the base of the housing generally as shown by arrow C) condensation can form on the surface of the emitter/receiver element 132 when the transducer unit is installed in place in a liquid container. This is condensation formed by the liquid in the container. This reduces efficacy of the transducer 120. The present embodiment allows the emitter/receiver element of the transducer to be arranged so that the emitter/receiver surface is facing at least partially horizontally, where horizontal refers to the direction as generally indicated by arrow D. This is a direction in which a signal travels approximately parallel to the base 91 of the housing. Preferably, the emitter/receiver element 132 is arranged to face in a horizontal manner. This prevents, or at least reduces the likelihood of, condensation forming on the surface of the emitter/receiver element 132. This is because the emitter/receiver surface is oriented vertically as opposed to horizontally.

It will be appreciated that the surface of the emitter/receiver element 132 does not have to be arranged such that it faces exactly in a horizontal manner. It could be arranged at other angles. However, the more the surface of emitter/receiver element 132 is oriented to face horizontally, the less likely condensation will form on the emitter/receiver surface.

Referring to FIGS. 10 and 12, the cradle 111 is formed from a solid block 140 of plastics or other solid material that is moulded to comprise a curved parabolic portion that forms the parabolic reflector 121 and extends to the signal aperture 150. A cylindrical wall extends from that reflector to form a cylindrical receptacle 142 for retaining the ultrasonic transducer 120. An aperture 143 is provided between the cylindrical receptacle 142 and the parabolic surface 121 to enable ultrasonic signals A, B to pass therethrough. On one side, the solid block of material 140 comprises the stub axle 123b that locates in the aperture of the pivot arm 110b in a rotatable manner.

Figure 13:
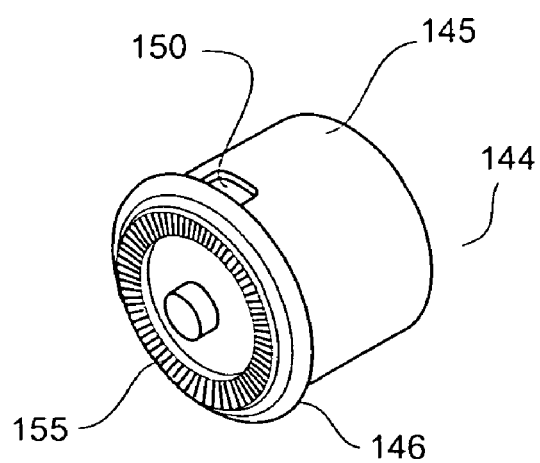
FIG. 13 shows an insert for retaining the transducer in the pivot cradle.

Referring to FIGS. 10, 12 and 13, a cylindrical insert 144 is disposed within the cylindrical receptacle formed by wall 142. The insert is produced from a suitable plastics or rubber type material that has some resilience. The insert 144 comprises a cylindrical wall 145 that is dimensioned to resistance fit in a snug manner within the walls of the transducer receptacle 142. Further, the insert has a lip 146 on its base that sits over and abuts the end edges of the wall of the receptacle 142. The ultrasonic transducer 120 is disposed with a resistance fit inside the insert 144 such that it abuts the base 147 of the insert and its emitter/receiver element surface 132 is directed towards the opening 143 in the cylindrical insert 144 and receptacle opening 142. This allows signals A, B to pass to and from the emitter/receiver element 132 through the openings 142 to the parabolic reflector 121 in a horizontal direction and change to a vertical direction upon impinging the reflector (A), and be received by the reflector in a vertical direction and changed to a horizontal direction (B).

The insert 144 also comprises an aperture 151 that enables electronic connections to be made from the transducer 120 to the electronics 94 in the housing 90. The insert also comprises the stub axle 123a that is adapted to engage in the aperture of the pivot arm 110a.

The stub axles 123a, 123b allow rotation or pivoting of the cradle 111 at various angles to orient the signal aperture 150 (and thus emitted signal A) in the desired direction. The parabolic insert 144 also comprises a serrated annular ring 155, or some other suitable resistance surface, which prevents the cradle 111 free rotating about the pivot point 123a, 123b. Rather, it provides some resistance against pivoting that allows the cradle 111 to be pivoted by hand into the desired position, but then retained in that position via the resistance of the serrated annular ring 155 against the inside surface of the pivot arm 110a.

Figure 14A:
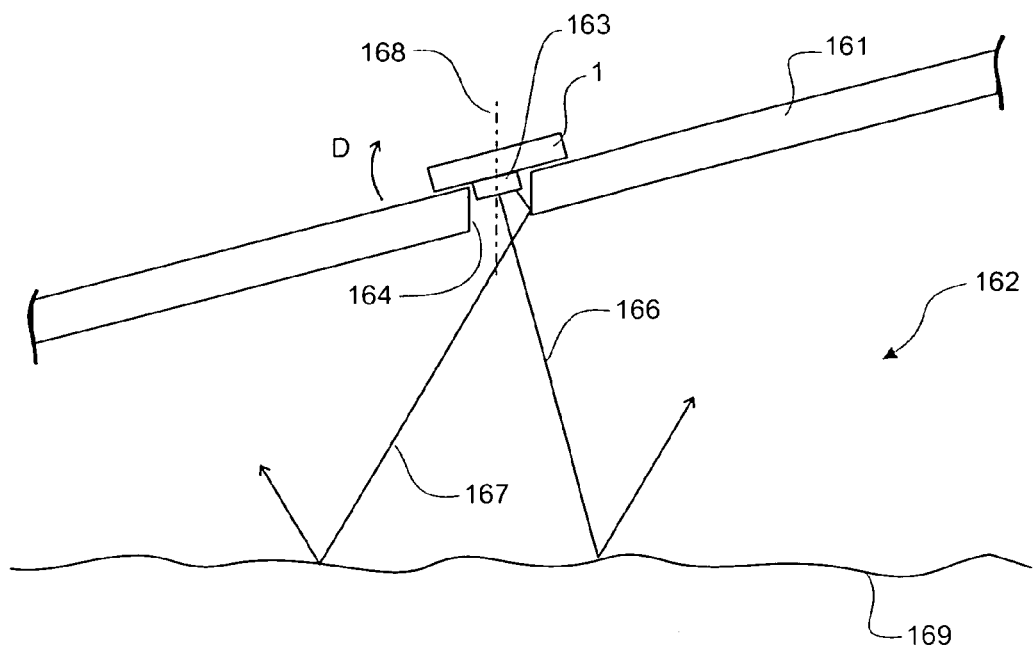
FIG. 14a shows the installation of a transducer unit without a pivotable signal aperture.

The manner in which the transducer unit 91 of the second embodiment is installed in a liquid container will be described with reference to FIGS. 14a and 14b. FIG. 14a shows a typical installation of a level sensor transducer unit 160 without the ability to redirect the ultrasonic signals. As can be seen, typically, the transducer unit 160 will be disposed on the roof 161 of a liquid container 162 with the aperture 163 from the transducer inserted proximate or in an opening 164 formed or made in the lid of the liquid container 161. Usually the lid will be inclined to some degree. Therefore, when the transducer unit 160 is installed such that its aperture 163 is put through the opening 164 in the lid 161, the direction of the ultrasonic signal 166, 167 coming out of the aperture 163 of the transducer unit will not necessarily be aimed directly through the lid opening 164, parallel with the opening axis 168. Rather, the signal 167 emitted from the transducer aperture 163 might hit the wall of the lid opening 164 and reflect off at an angle. This results in a reflected signal off the surface of the liquid 169 that does not reach the transducer unit 160. Likewise, an ultrasonic signal 160 that does travel through the lid opening 164 unimpeded might still reflect off the surface of the liquid 169 at an angle that is not received by the transducer unit 160. This reduces the effectiveness of the transducer unit 160 of the level sensor system.

To overcome this drawback, the transducer unit 160 has to be arranged on the lid such that one side is propped up and rotated slightly (see arrow D) so that the transducer aperture 163 is pointing as much as possible in the direction of the axis 168 of the lid opening 164. This means that the base of the transducer unit might not rest squarely on the lid surface, but rather sit at an angle to it. This makes installation more difficult.

Figure 14B:
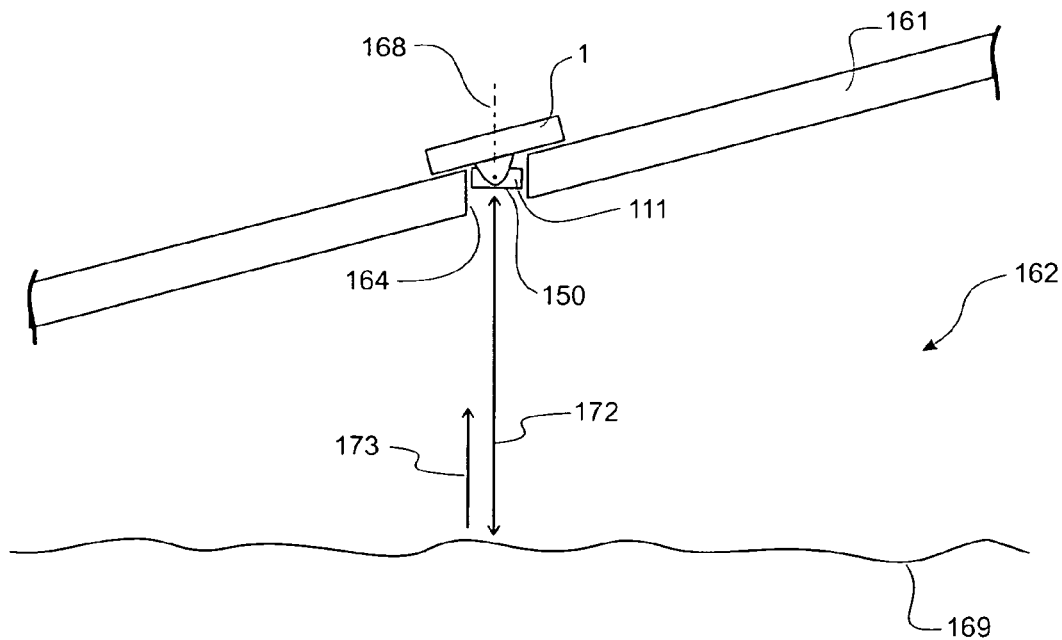
FIG. 14b shows the installation of a transducer unit with a pivotable signal aperture.

Referring to FIG. 14b, placing the second embodiment overcomes this difficulty by enabling redirection of the ultrasonic signal using the signal aperture 150. In this case the transducer unit 91 can be placed on the lid 161 of the liquid container 162 so that the base 92 rests squarely on the top surface of the lid 161. The pivoting cradle 111 with the transducer 120, parabolic reflector 121 and signal aperture 150 are arranged at least partially inside the opening 164 in the lid 161. The pivoting cradle 111 is then rotated such that the signal aperture 150 is aligned parallel with the axis 168 of the lid opening 164 so that any signal 172 exiting the aperture 150 is directed parallel to the opening axis 168 and hits squarely on the liquid surface 169. The reflected signal 173 can then reflect straight up parallel to the lid opening axis 168 and into the signal aperture 150 where it is reflected off the parabolic reflector 121 into the transducer 120 where it is received.

Having a pivotable signal aperture 150 which enables redirection of the emitted signal 172 enables the transducer unit 91 to be more easily installed on the lid of a liquid container.

It should be noted that FIGS. 14a and 14b are in schematic form and the dimensions and various angles are exaggerated to clearly demonstrate installation.

The transducer unit 1 comprises a tank depth input means for setting the tank depth. This might be way of a DIP switch, electronic input, rotator dial or some other suitable means. This enables the user to manually set the depth of the liquid container. This then enables the controller of the transducer unit to calculate the depth of the liquid level from the ultrasonic signal reflected from the surface of the liquid. From the signal, the controller can work out the distance between the transducer unit 91 and the surface of the liquid level. Subtracting this figure from the total depth of the liquid container as set by the user provides an approximate level of the liquid surface from the bottom of the container.

Bench Unit/Output Unit

Figure 15A:
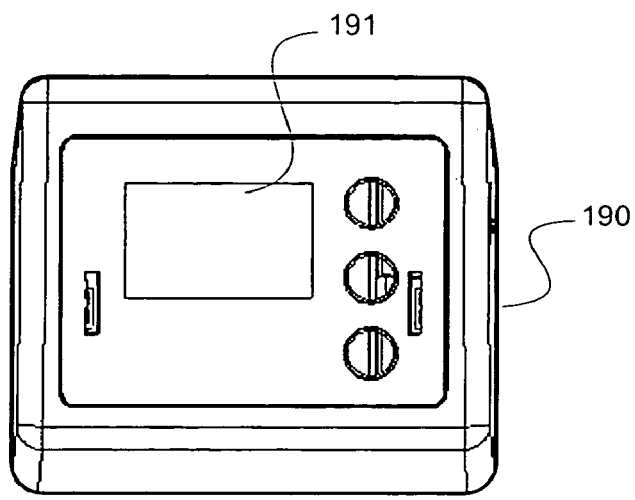
FIGS. 15a-15c show a second embodiment of a bench or output unit.
Figure 15B:
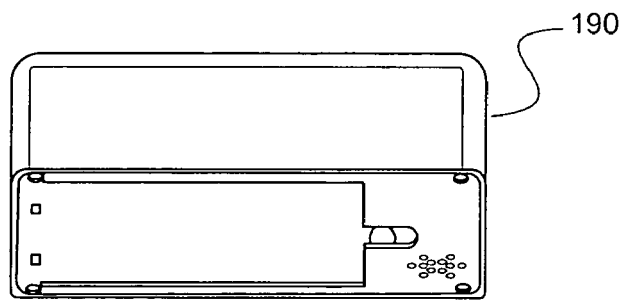
Figure 15C:
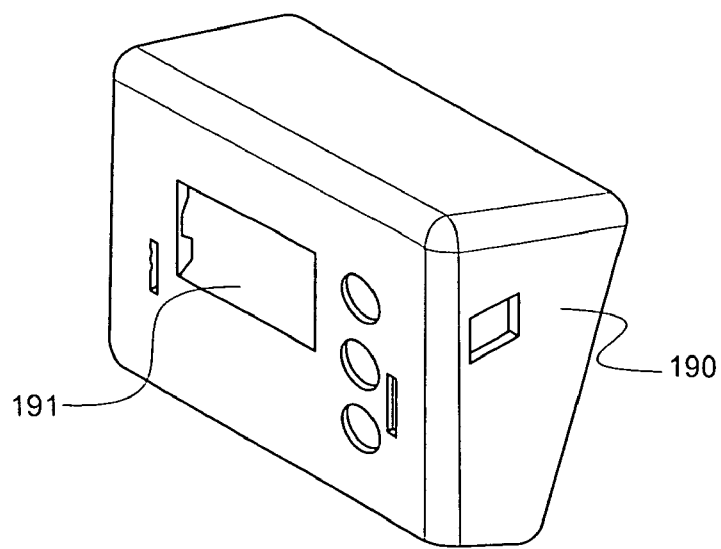

FIGS. 15a to 15c show a second embodiment of the output unit or bench unit. As with the first embodiment, it has functionality to receive an indication of liquid level and display this. The functionality and the components of this embodiment are the same as the first embodiment, except for the differences which will be described here.

The second embodiment 190 comprises an LCD 191 or other type of screen. This enables the unit to graphically display the liquid level using alpha numeric symbols.

Figure 16A:
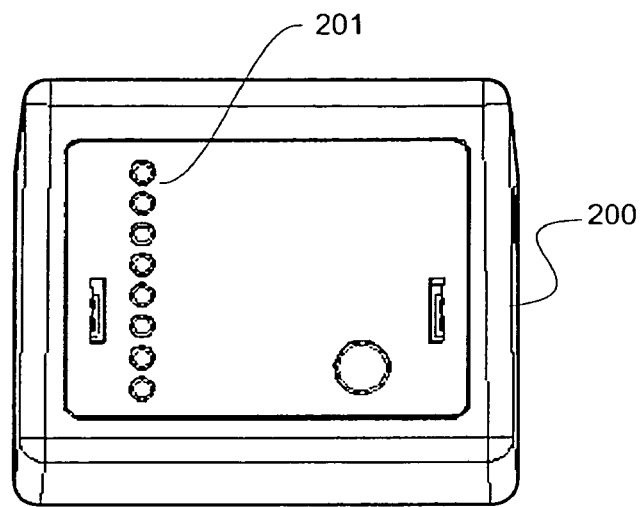
FIG. 16a-16c show an alternative embodiment of a bench or output unit.
Figure 16B:
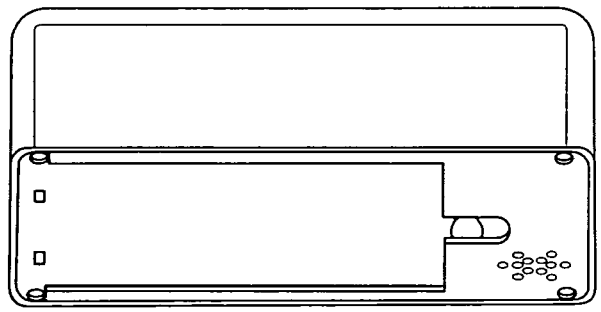
Figure 16C:
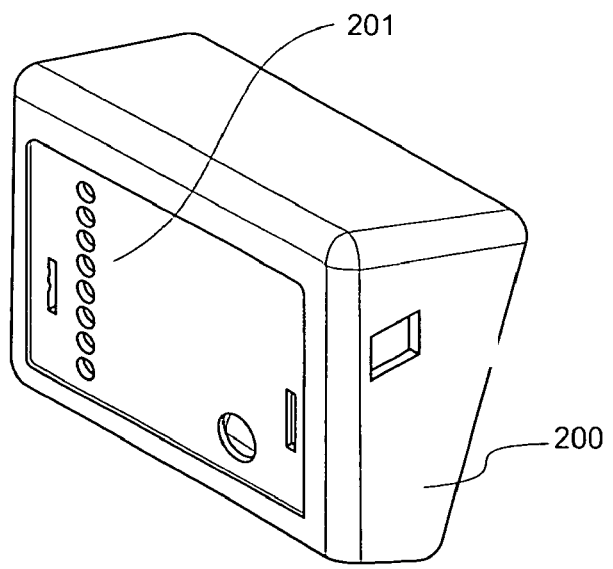

FIG. 16a-16c show an alternative embodiment 200 of the output unit. It comprises an array of LEDs 201 that indicate the water level.

The second and third embodiments of the bench unit can indicate the following:
1. current water level,
2. loss of signal,
3. low battery of the bench unit or outdoor unit,
4. rapid water loss.

Operation of Transducer and Bench Unit

Operation of the second embodiment of the level sensor system will be described with reference to FIGS. 9a-9c, and 15a-16c.

When the transducer unit 90 is powered, it goes into receive mode. Each message sent from the transducer unit contains the following.
1. The water level reading that has been measured.
2. A flag to inform the output unit e.g. 190 unit if the battery is low.
3. The time that the transducer unit will next transmit the next message.
4. The ID number that is the same for each bench unit and transducer pair.

On reception of the first message the output unit 190 will program itself to wake up at the time it is told to by the transducer unit 1 then it will go to sleep. If no signal comes at that time, then the rapid water loss function will be activated.

Importantly, not every transducer unit 1 sends out its message at the same interval. They all have an extra "random" time added. This is calculated from the ID number that is defined for each transducer and bench unit pair. This number is always the same. Therefore, if the transducer unit 1 misses one message, then it can go back to sleep and wait until it should get the next one, since the time period is the same as last time. If it misses too many, then the bench unit goes back to permanent listening mode to become resynchronized. This compensates for problems such as replacing the transducer unit battery.

This method reduces battery consumption since for most of the time the output unit 190 no longer needs to be receiving. The "random" time periods means that even if a number of transducer units are in reception range, most of the time they will not interfere with each other.

In the output unit 200 shown in FIG. 16a-16c, both the reading and errors are displayed on the 8 LEDs on the bench unit 200. When displaying the readings, all the LEDs up to that level are lit, so it's a barograph; hence for the lowest level only the bottom LED is on, while when the tank is full they are all one.

When displaying an error, the bottom LED is always off hence the user can tell the difference. At the moment the errors/warnings that are displayed are:
1. no reception,
2. transducer unit battery state,
3. output unit battery state,
4. internal fault,
5. no range,
6. rapid water loss indicator.

The internal fault error indicates that the software has detected an error with itself, such as a case statement where the value passed into it is not one predefined. For the "No range" fault information please see the "Ranging" section.

The system also has a rapid waterloss correction function.

This function alerts the user if the water level drops more than a predefined about in a given time.

The method of implementation displays the error if two consecutive readings show a water loss. Hence, three readings need to be taken to achieve this; the reference and two samples.

The system is also adapted to perform detection of when the water level is close to the transducer 120.

This does not work by looking for an ultrasonic echo, but instead by determining if the oscillations of the ultrasonic transducer, from the point of excitation, differ significantly from what was expected. Hence, there is no period when the ultrasonic signal is not oscillating when doing very close ranging using this method.

This detection method is implemented in the transducer unit 1 by knowledge of profile of the cone or reflector that it is using. If the ringing is greater than a predefined level after a predefined time, then it is determined that a return signal was received and the distance from the transducer to the ultrasonic reflecting substance/object is very close.

The system further detects a loss of signal. If the receiver does not receive a signal at the pre-determined time then an error occurs. Each time the transducer unit 1 sends a message to the output unit e.g. 190, it includes the information on when the output unit 190 should receive the next message. Hence, it can be determined if the signal is lost.

The system also moniters the battery status. The battery status is sent remotely.

As well as sending the measured battery reading the transducer unit 1 also sends a flag that tells the output unit 190 if the battery is below a predefined limit. The bench unit also measures its battery level. These can both be displayed to the user.

The liquid surface may not always be flat or stable when doing a reading. For example, the tank could be filling. This generates noise and the surface might be moving, causing beam scatter. Instead of giving back fast moving and noisy readings, a hysteresis is used so that the readings returned are more stable. A sample must have a difference greater than a pre-defined amount before the new reading is used, otherwise the old reading is reused.

The readings could be scaled before displaying to the user so that different tank sizes can be used with the system. It is necessary to know how large to tank is in order to do this so that the tank this can be used to work out a percentage of how full that tank is. This is achieved in the system by four DIP switches that allow the user to select tank sizes from 1 m to 4 m, or any other suitable range.

The system can also provide ranging.

This works by sending an ultrasonic pulse from the transducer. It first checks to see if the object/surface is very close using the "close detection method". If not, it will use the standard method of detecting the distance by the time it takes the pulse to be received.

At first it will attempt to send out just one pulse at 40 KHz. If no object/surface is found with the "close detection method" or the standard method of detecting range, then a range can not be obtained. Either way, the transducer unit will do number of ranging attempts using adjusting to variables, sensitivities and the number of pulses.

The method of determining the average of these samples is the median method. If there are even numbers of samples then the sample below the center point is used. If no range is detected by any of the ranging attempts then the error "no range" is generated. This value is passed through the "hysterisis function".

It is necessary to know the tank height in order to determine how full the tank it. To do this a dip switch setting is set to indicate different tank sizes from 1 m to 4 m. The readings are scaled to a percentage of the tanks maximum volume. The adjusted reading is then sent back to the bench unit.

Further Alternatives

It will be appreciated that any of the three bench units described could be used with either of the transducer units described.

It will be appreciated that it is not essential for the reflector to be parabolic. It could be other shapes as well, such as planar. However, having a parabolic reflector enables more flexibility in the relative orientations of the emitter/receiver element 132 of the transducer 120 and the reflector 121. When a planar a reflector is used, the relative angles between the emitter and the reflector must be more precise to ensure that ultrasonic signals emitted are directed out the aperture, and received signals are received by the transducer.

While in the preferred embodiment there is a horizontally displaced ultrasonic transducer with a parabolic reflector along with a pivotable cradle it will be appreciated that an embodiment might not necessarily have to have both these features. For example, a particular level sensor might only comprise a horizontally displaced transducer with the parabolic reflector, in order to reduce the effects of condensation. In this case, a pivotable cradle might not be required due to mounting requirements. Alternatively, a pivoting cradle could be used with a vertically disposed ultrasonic transducer, where reducing the effects of condensation is not critical, or where condensation is unlikely to occur.

The shape of the parabolic reflector helps to reduce internal reflections from the cone system and hence dampen the natural oscillation of the ultrasonic system making it easier to detect objects closer to the device without having to rely as much on the extremely close detection method.

The invention claimed is:

1. A level sensor for providing an indication of liquid level in a container comprising:
   an ultrasonic transducer recessed in a receptacle, said receptacle having an opening for emitting an ultrasonic signal to the surface of the liquid and for detecting a return signal, reflected from the surface,
   a controller that instructs the transducer to emit ultrasonic signals and receives an indication that a return signal has been detected, the controller comprising a timer for measuring the time period between emission of the ultrasonic signal and receipt of a return signal, the determined time period providing an indication of the liquid level,
   a radio transmitter that receives an indication of the liquid level and transmits a radio liquid level signal comprising the level indication to a remote output unit, and
   a reflector arranged to reflect the ultrasonic signal emitted from the ultrasonic transducer, the ultrasonic transducer being oriented to emit the ultrasonic signal towards the reflector,
   the ultrasonic transducer including an emitter element, the ultrasonic transducer being oriented to reduce condensation forming on the emitter element,
   the ultrasonic transducer being oriented so that the emitter element faces at least partially horizontally and towards the reflector, the ultrasonic transducer emitting the ultrasonic signal through the opening towards the reflector,
   the reflector being parabolically shaped to reflect the ultrasonic signal from horizontally to vertically and from vertically to horizontally, and
   a housing, the reflector and the ultrasonic transducer being pivotably attached with respect to the housing about a horizontally extending pivot axis to alter a direction of a reflected ultrasonic signal emitted from the ultrasonic transducer.

2. A level sensor adapted to be installed on, in or proximate a liquid container to sense a liquid level in the container, the level sensor comprising:
   a housing adapted to be installed on, in or proximate the liquid container,
   an ultrasonic transducer with an emitter element recessed in a receptacle the ultrasonic transducer emitting an ultrasonic signal through an opening of the receptacle towards a surface of a liquid in the liquid container and for detecting a return signal, reflected from the surface,
   a parabolic reflector oriented to reflect the ultrasonic signal emitted from the ultrasonic transducer,
   a controller that instructs the transducer to emit ultrasonic signals and receives an indication that a return signal has been detected, the controller comprising a timer for measuring the time period between emission of the ultrasonic signal and receipt of a return signal, the determined time period providing an indication of the liquid level, and
   a radio transmitter that receives an indication of the liquid level and transmits a radio liquid level signal comprising the level indication to a remote output unit,
   the ultrasonic transducer emitter element being oriented to at least partially face horizontally towards the parabolic reflector, the ultrasonic transducer emitting the ultrasonic signal through the opening towards the parabolic reflector, and
   the parabolic reflector and the ultrasonic transducer being pivotably attached with respect to the housing about a horizontally extending pivot axis to enable directing of the ultrasonic signal emitted from the ultrasonic transducer horizontally through the opening, reflecting off the parabolic reflector and vertically towards the surface of the liquid in the liquid container, when the level sensor is installed on, in or proximate the liquid container.

* * * * *